US011172483B2

United States Patent
Gaal et al.

(10) Patent No.: US 11,172,483 B2
(45) Date of Patent: *Nov. 9, 2021

(54) CHANNEL RASTER DESIGN IN WIRELESS COMMUNICATIONS

(71) Applicant: QUALCOMM Incorporated, San Diego, CA (US)

(72) Inventors: Peter Gaal, San Diego, CA (US); Haitong Sun, Cupertino, CA (US); Heechoon Lee, San Diego, CA (US); Wanshi Chen, San Diego, CA (US); Hung Ly, San Diego, CA (US); Joseph Binamira Soriaga, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,129

(22) Filed: Jun. 22, 2020

(65) Prior Publication Data
US 2021/0007098 A1    Jan. 7, 2021

Related U.S. Application Data

(63) Continuation of application No. 16/220,767, filed on Dec. 14, 2018, now Pat. No. 10,694,521, which is a
(Continued)

(51) Int. Cl.
*H04W 72/04*    (2009.01)
*H04W 72/02*    (2009.01)
*H04L 5/00*    (2006.01)

(52) U.S. Cl.
CPC ......... *H04W 72/0453* (2013.01); *H04L 5/001* (2013.01); *H04L 5/0007* (2013.01);
(Continued)

(58) Field of Classification Search
CPC .............. H04W 72/0453; H04W 72/02; H04L 5/0007; H04L 5/001; H04L 5/0023; H04L 5/0092
See application file for complete search history.

(56) References Cited

U.S. PATENT DOCUMENTS 9,572,047 B2    2/2017  Faerber
10,194,440 B2*  1/2019  Gaal ................. H04W 72/0453
(Continued)

FOREIGN PATENT DOCUMENTS

CN    105765876 A    7/2016
CN    108476078 A    8/2018
(Continued)

OTHER PUBLICATIONS

3GPP TS 36.211 V8.0.0; "3rd Generation Partnership Project;Technical Specification Group Radio Access Network; Evolved Universal Terrestrial Radio Access (E-UTRA); Physical channels and modulation (Release 8)", [Online] 2007, pp. 1-50, XP002520076 Retrieved from the Internet: URL:http://www.3gpp.org/ftp/Specs/html-info/36211htm [retrieved on Sep. 27, 2007] Section 5.
(Continued)

*Primary Examiner* — Kashif Siddiqui
(74) *Attorney, Agent, or Firm* — Qualcomm Incorporated

(57) ABSTRACT

Aspects of the present disclosure describe determining an uplink channel raster for determining frequency location of an uplink channel over which to transmit uplink communications to a base station. Uplink communications can be transmitted to the base station over the uplink channel. The uplink channel raster can be shifted, in frequency, with respect to a legacy uplink channel raster of a legacy communication technology to facilitate coexistence, in an uplink carrier, of the uplink channel and one or more uplink channels of the legacy communication technology.

30 Claims, 7 Drawing Sheets

Related U.S. Application Data continuation of application No. 15/861,565, filed on Jan. 3, 2018, now Pat. No. 10,194,440.

(60) Provisional application No. 62/466,966, filed on Mar. 3, 2017.

(52) U.S. Cl.
CPC .......... *H04L 5/0023* (2013.01); *H04L 5/0092* (2013.01); *H04W 72/02* (2013.01)

(56) References Cited

U.S. PATENT DOCUMENTS

| | | | |
|---|---|---|---|
| 10,601,627 B2 | 3/2020 | Yi | |
| 10,694,521 B2* | 6/2020 | Gaal | H04L 5/0023 |
| 2012/0202487 A1* | 8/2012 | Kazmi | H04W 72/0453 |
| | | | 455/432.1 |
| 2015/0016339 A1* | 1/2015 | You | H04W 56/001 |
| | | | 370/328 |
| 2015/0189518 A1* | 7/2015 | Faerber | H04W 24/02 |
| | | | 455/450 |
| 2016/0309367 A1 | 10/2016 | Li et al. | |
| 2017/0265156 A1 | 9/2017 | Xue et al. | |
| 2018/0255553 A1 | 9/2018 | Gaal et al. | |
| 2019/0141705 A1 | 5/2019 | Dalipi et al. | |
| 2019/0239213 A1 | 8/2019 | Wolff et al. | |

FOREIGN PATENT DOCUMENTS

| | | |
|---|---|---|
| WO | WO-2012108734 A2 | 8/2012 |
| WO | WO-2017019133 A1 | 2/2017 |
| WO | WO-2017033841 A1 | 3/2017 |
| WO | WO-2017123279 A1 | 7/2017 |

OTHER PUBLICATIONS

Ericsson: "On Half-Subcarrier Shift in NR UL", 3GPP Draft; R1-1609645, TSG-RAN WG1 86bis, vol. RAN WG1, No. Lisbon, Portugal; Oct. 10, 2016-Oct. 14, 2016, Oct. 9, 2016 (Oct. 9, 2016), 1 Page, XP051149680, URL: http://www.3gpp.org/ftp/Meetings_3GPP_SYNC/RAN1/Docs/, Sec1-2.

Ericsson: "NB-IoT—Synchronization Channel Evaluations", 3GPP TSG-RAN WG1 NB-IOT AdHoc, R1-160080, Jan. 18-22, 2016, Budapest, Hungary, pp. 1-6.

Ericsson: "NB-IoT Channel Raster", 3GPP TSG-RAN1 NB-IOT Ad Hoc, R1-160082, Jan. 18-22, 2016, Budapest, Hungary, pp. 1-3.

Huawei, et al., "Analysis of Channel Raster Impact on NB-IoT", 3GPP TSG RAN WG1 #83, 3GPP Draft; R1-156924, 3rd Generation Partnership Project (3GPP), Mobile Competence Centre, 650, Route Des Lucioles, F-06921, Sophia-Antipolis Cedex, France, vol. RAN WG1, No. Anaheim, USA, Nov. 7, 2015, Nov. 15-22, 2015, 5 Pages, XP051042113, Retrieved from the Internet: URL: http://www.3gpp.org/ftp/tsg_ran/WG1_RL1/TSGR1_83/Docs/ [retrieved on Nov. 7, 2015], Sec 2-5.

Huawei, et al., "Channel Raster Design," 3GPP Draft; R1-160313, 3GPP TSG RAN WG1 Meeting 84, 3rd Generation Partnership Project (3GPP), Mobile Competence Centre; 650, Route Des Lucioles; F-06921 Sophia-Antipolis Cedex; ; France; vol. RAN WG1, No. St Julian's, Malta; Feb. 15, 2016-Feb. 19, 2016; Feb. 14, 2016 (Feb. 14, 2016), 3 pages, XP051053653, Retrieved from the Internet: URL: http://www.3gpp.org/ftp/Meetings_3GPP_SYNC/RAN1/Docs/ [retrieved on Feb. 14, 2016], Sec 1-3.

Intel Corporation: "Operation Mode Indication and Channel Raster for NB-IoT", 3GPP TSG RAN WG1 #84, 3GPP Draft; R1-160408, vol. RAN WG1, No. St Julian's, Malta; Feb. 15, 2016-Feb. 19, 2016, Feb. 6, 2016 (Feb. 6, 2016), pp. 1-4, XP051064167, URL: http://www.3gpp.org/ftp/tsg_ran/WG1_RL1/TSGR1_84/Docs/.

Intel Corporation: "On the Need for Fractional PRBs in NR", 3GPP Draft; R1-1611961, 3rd Generation Partnership Project (3gpp), Mobile Competence Centre, 650, Route Des Lucioles, F-06921 Sophia-Antipolis Cedex, France, vol. RAN WG1, No. Reno, USA; Nov. 13, 2016, XP051175927, Retrieved from the Internet: URL:http://www.3gpp.org/ftp/Meetings_3GPP_SYNC/RAN1/Docs/ [retrieved on Nov. 13, 2016], 4 pages.

International Search Report and Written Opinion—PCT/US2018/012818—ISA/EPO—dated Apr. 20, 2018.

International Preliminary Report on Patentability—PCT/US2018/012818, the International Bureau of WIPO—Geneva, Switzerland, Sep. 12, 2019.

Nokia Networks: "On the Channel Raster Design for NB-IoT", 3GPP TSG-RAN WG1 NB-IoT AdHoc, R1-160172, 3rd Generation Partnership Project (3GPP), Mobile Competence Centre, 650, Route Des Lucioles, F-06921, Sophia-Antipolis Cedex, France, vol. RAN WG1, No. Budapest, HU; Jan. 12, 2016, Jan. 18-20, 2016, Agenda item: 2.1.1.4, XP051064776, 7 pages, Retrieved from the Internet: URL: http://www.3gpp.org/ftp/tsg_ran/WG1_RL1/TSGR1_AH/LTE NB-IoT_1601/Docs/ [retrieved on Jan. 12, 2016].

Taiwan Search Report—TW107100749—TIPO—dated Mar. 6, 2021.

NTT Docomo, Inc: "Workplan for Study on NR Access Technology", 3GPP Draft, 3GPP TSG RAN WG1 Meeting #88, R1-1702795, Athens, Greece Feb. 13-17, 2017, pp. 1-136.

Panasonic: "Discussion on Frequency Domain Frame Structure for NR", 3GPP Draft, 3GPP TSG RAN WG1 Meeting #87, R1-1611892, Reno, USA, Nov. 14-18, 2016, pp. 1-5.

Panasonic: "Discussion on Physical Resource Block for NR Numerologies", 3GPP Draft, 3GPP TSG RAN WG1 Meeting #86, R1-167338, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), XP051140627, pp. 1-4, Retrieved from the Internet: URL:http://www.3gpp.org/ftp/Meetings_3GPP_SYNC/RAN1/Docs.

\* cited by examiner

CHANNEL RASTER DESIGN IN WIRELESS COMMUNICATIONS

CLAIM OF PRIORITY UNDER 35 U.S.C. § 119

The present Application for Patent is a Continuation of U.S. patent application Ser. No. 16/220,767, entitled "CHANNEL RASTER DESIGN IN WIRELESS COMMUNICATIONS" filed Dec. 14, 2018, which is a Continuation of U.S. patent application Ser. No. 15/861,565, entitled "CHANNEL RASTER DESIGN IN WIRELESS COMMUNICATIONS" filed Jan. 3, 2018, which claims priority to Provisional Application No. 62/466,966, entitled "UPLINK CHANNEL RASTER DESIGN IN WIRELESS COMMUNICATIONS" filed Mar. 3, 2017, which are assigned to the assignee hereof and are hereby expressly incorporated by reference herein for all purposes.

BACKGROUND

Aspects of the present disclosure relate generally to wireless communication systems, and more particularly, to providing a channel raster for uplink and/or downlink communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is presented. The method includes determining an uplink channel raster for determining frequency location of an uplink channel over which to transmit uplink communications to a base station, and transmitting uplink communications to the base station over the uplink channel. The uplink channel raster is shifted, in frequency, with respect to a legacy uplink channel raster of a legacy communication technology to facilitate coexistence, in an uplink carrier, of the uplink channel and one or more uplink channels of the legacy communication technology.

In another example, an apparatus for wireless communication is presented including a transceiver, a memory configured to store instructions, and one or more processors communicatively coupled with the transceiver and the memory. The one or more processors are configured to determine an uplink channel raster for determining frequency location of an uplink channel over which to transmit uplink communications to a base station, and transmit uplink communications to the base station over the uplink channel. The uplink channel raster is shifted, in frequency, with respect to a legacy uplink channel raster of a legacy communication technology to facilitate coexistence, in an uplink carrier, of the uplink channel and one or more uplink channels of the legacy communication technology.

In another example, an apparatus for wireless communication is presented including means for determining an uplink channel raster for determining frequency location of an uplink channel over which to transmit uplink communications to a base station, and means for transmitting uplink communications to the base station over the uplink channel. The uplink channel raster is shifted, in frequency, with respect to a legacy uplink channel raster of a legacy communication technology to facilitate coexistence, in an uplink carrier, of the uplink channel and one or more uplink channels of the legacy communication technology In a further example, a computer-readable medium, including code executable by one or more processors for wireless communications is presented. The code includes code for determining an uplink channel raster for determining frequency location of an uplink channel over which to transmit uplink communications to a base station, and code for transmitting uplink communications to the base station over the uplink channel. The uplink channel raster is shifted, in frequency, with respect to a legacy uplink channel raster of a legacy communication technology to facilitate coexistence, in an uplink carrier, of the uplink channel and one or more uplink channels of the legacy communication technology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
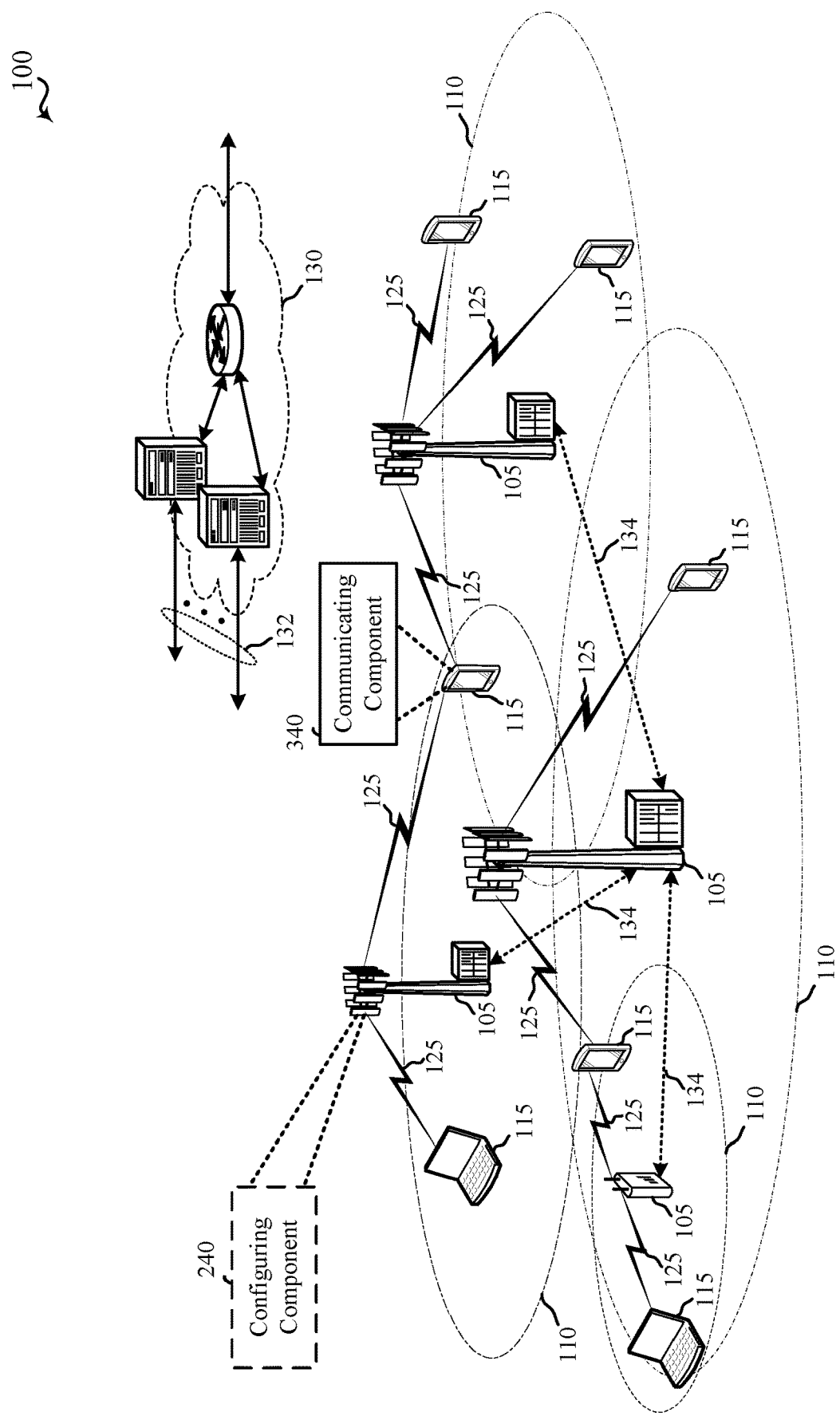
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing a channel raster (e.g., for uplink and/or downlink communications) in low latency communication technologies, such as technologies that support latency improvements to legacy communication technologies. For example, a legacy communication technology, such as long term evolution (LTE), may support a transmission time interval (TTI) that is one subframe (e.g., one millisecond) in duration. Newer low latency communication technologies, such as fifth generation (5G) new radio (NR), also referred to herein as "5G" or "NR," may be based on LTE concepts, specifications, etc., but may use different short transmission time interval (sTTI) lengths, such as a two symbol sTTI (e.g., in a legacy subframe comprising 12 or 14 symbols), one slot sTTI (e.g., in a legacy subframe comprising two slots), etc., to provide faster communication capabilities. In an example, the low latency communication technology may use different sTTI for uplink and downlink communications. Moreover, for example, the legacy communication technology and low latency communication technology can coexist on the same or different carrier frequencies.

In a specific example, 5G NR can coexist with LTE on an uplink (UL) and/or downlink (DL) carrier (e.g., such that 5G NR and LTE can share uplink and/or downlink subframes over one or more carriers, a set of subcarriers, etc.). In addition, for example, 5G NR and LTE can be collocated on the same base station. In one example, however, 5G NR and LTE may use different DL carriers. Thus, a standalone NR user equipment (UE) may access standalone NR carriers on an associated frequency (F2) and may not be connected to an LTE carrier, while a dual connectivity UE can access an LTE primary cell (PCell) with LTE UL on an associated frequency (F1), and then can be configured by dual connectivity to also operate NR UL on F1 (and/or on F2 for DL).

In an example, 5G NR and LTE can be configured to be aligned in tone and/or resource block, at least in a cell where the same UL carrier is used for 5G NR and LTE, which can provide improved interference management and resource utilization among the wireless communication technologies, as well as more flexible scheduling between 5G NR and LTE. In one example, 5G NR and LTE may use the same subcarrier spacing (SCS) (e.g., a 15 kilohertz (kHz) SCS).

In addition, for example, 5G NR can utilize the same UL channel raster as LTE UL (e.g., 100 kHz) in order to allow more flexible NR and LTE coexistence while ensuring LTE and NR tone alignment, and/or may use a potentially different DL channel raster as LTE DL (e.g., 120 kHz, 180 kHz, 300 kHz) in order to achieve tone alignment between NR data/control and the synchronization signal. By channel raster, e.g., it is meant that the carrier frequency for the channel is a multiple of 100 kHz. In one example, the relationship between DL and UL channel raster in 5G NR may be different for different system bandwidths (e.g., the DL and UL channel raster may be different for sub-6 gigahertz (GHz), or sub-3 GHz, but may be the same for above 6 GHz, etc.). Moreover, in an example, 5G NR, or other low latency communication technologies, may not, by design, have special direct current (DC) or dead center tone treatment like the half-tone shift of LTE, and thus may implement a half-tone (or half subcarrier) shift in at least the UL channel raster to align in tone/RB with LTE, or other legacy communication technologies, on the UL carrier. The shift can be implemented by applying an offset when computing a frequency for the UL carrier based on an Evolved Universal Mobile Telecommunications Service (UMTS) Terrestrial Radio Access (E-UTRA) Absolute Radio-Frequency Channel Number (EARFCN). In another example, a different EARFCN can be configured for UL and DL carriers to achieve the alignment at least on the UL carrier. For example, the EARFCN may be configured in NR system information (SI) broadcast (e.g., along with via random access channel (RACH) configuration), radio resource control (RRC) signaling, etc.

In other examples, where NR wideband is configured, coexistence and alignment with LTE can be achieved by aligning the NR wideband with contiguous LTE carriers in LTE carrier aggregation (CA). In this example, a fractional RB can be inserted into the NR wideband to align with the multiple contiguous LTE carriers, which may have a guard-band separating each of the multiple carriers. In another example, LTE guard-band on the UL carrier that is larger than the guard-band configured for 5G NR can be utilized for the UL channel in 5G NR. In yet another example, the UL carrier that coexists with LTE can be used to communicate critical information, such as control data (e.g., layer 1 control, layer 2 control, radio link control (RLC) layer status protocol data unit (PDU), layer 3 signaling, etc. In this example, another 5G NR UL carrier that does not coexist with LTE can be used for data communications.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different subcarrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an example, a UE 115 can include a communicating component 340 configured to determine a UL (and/or DL) channel raster for communicating with one or more base stations 105. For example, the communicating component 340 can determine a UL channel raster for a low latency communication technology, such as 5G NR, that can have a tone and/or RB alignment with a legacy UL channel raster of a legacy communication technology, such as LTE, to facilitate coexistence with the legacy communication technology in the UL carrier. Additionally, or alternatively, the UL channel raster for the low latency communication technology can be determined to be different than a DL channel raster. In one example, the base station 105 may include a configuring component 240 configured to transmit, to the UE 115, one or more parameters related to a configuration of the UL channel raster, such as a frequency location for the UL channel raster, which may include a channel number (e.g., EARFCN), a frequency location for inserting a fractional RB into a wideband, etc. Moreover, in an example, communicating component 340 can be configured to transmit certain communications (e.g., control data) over the UL carrier that coexists with the legacy communication technology and/or to transmit other communications (e.g., data) over a different UL carrier that does not coexist with the legacy communication technology.

Figure 2:
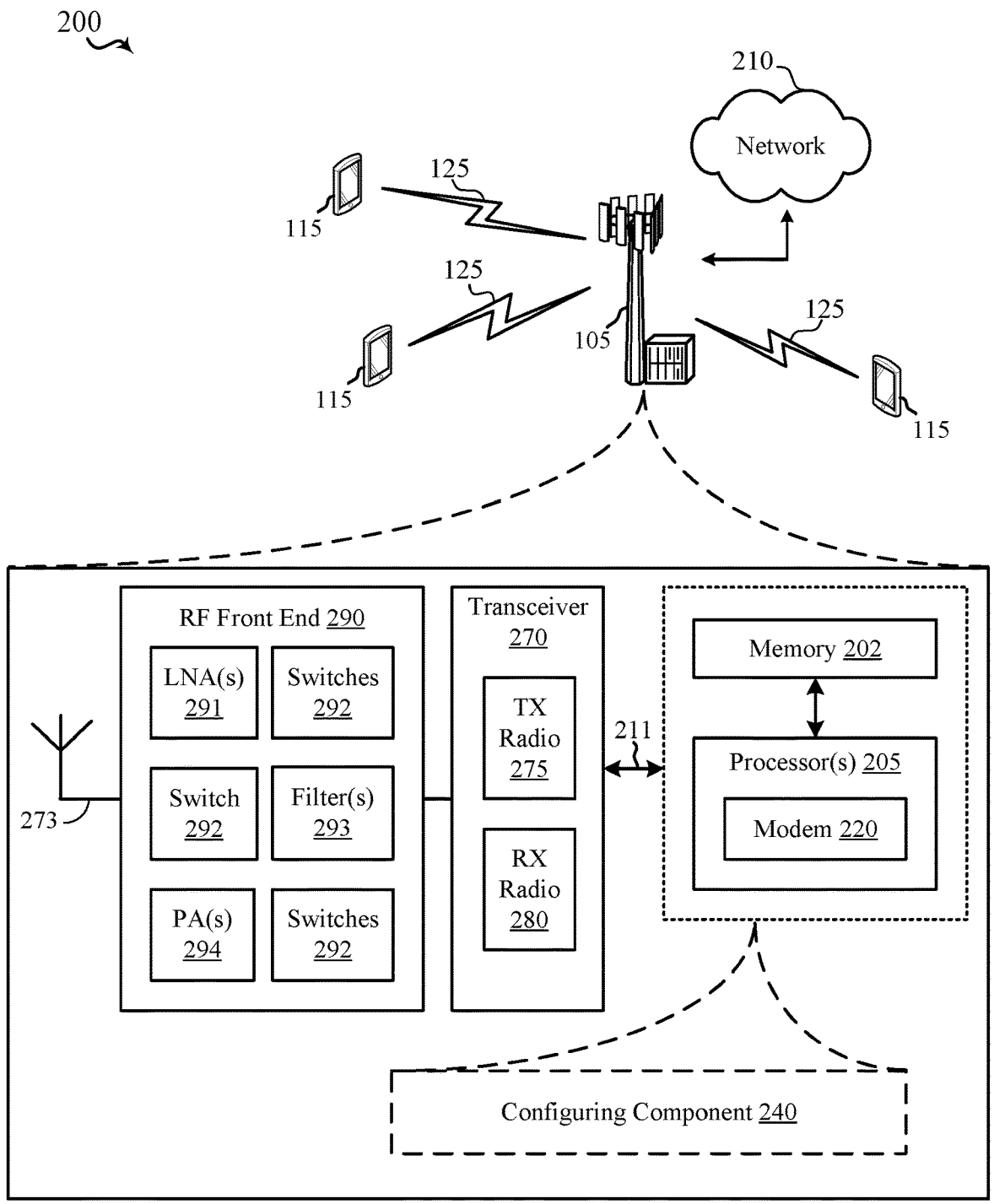
FIG. 2 is a block diagram illustrating an example of a base station, in accordance with various aspects of the present disclosure.
Figure 3:
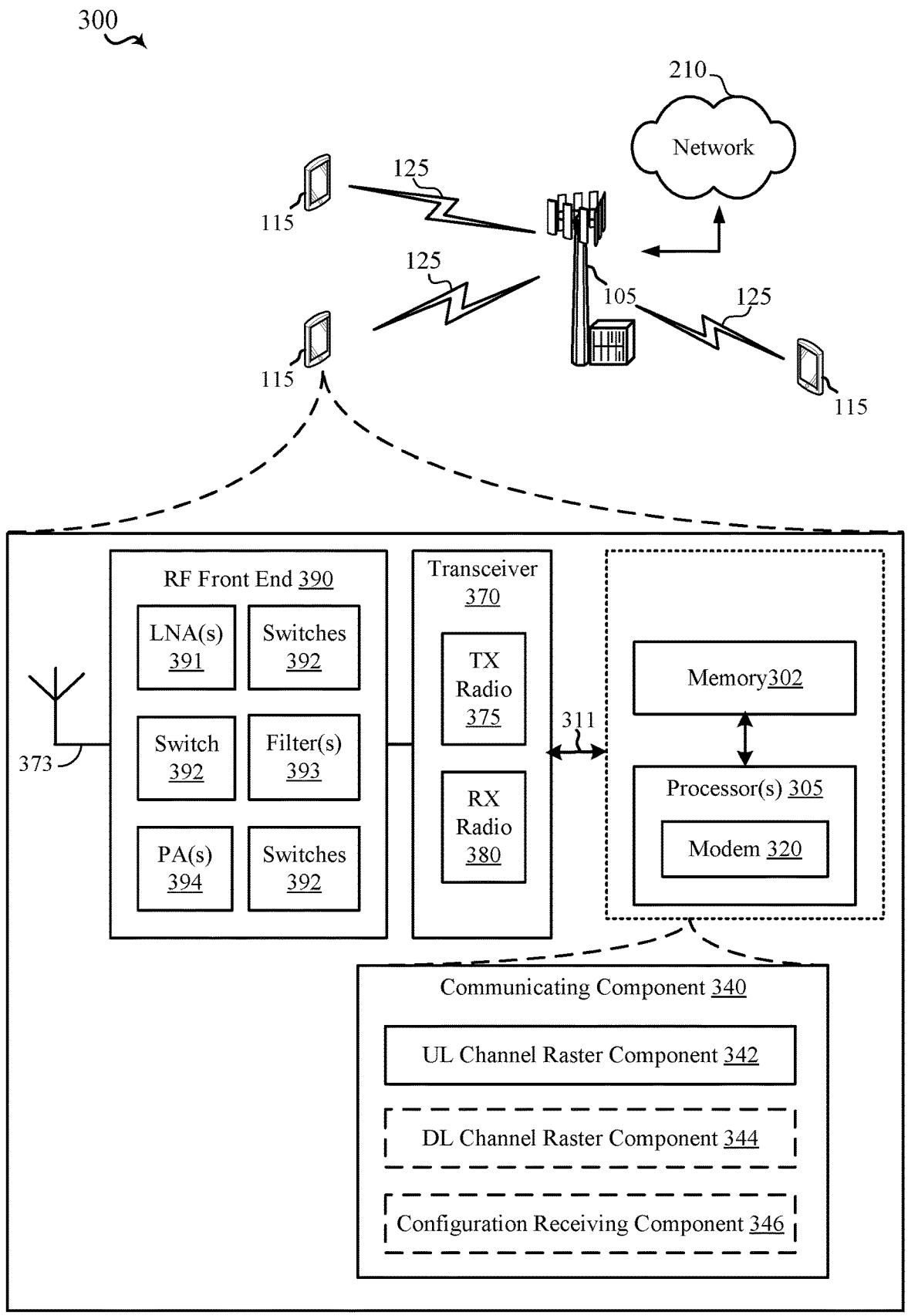
FIG. 3 is a block diagram illustrating an example of a UE, in accordance with various aspects of the present disclosure.
Figure 4:
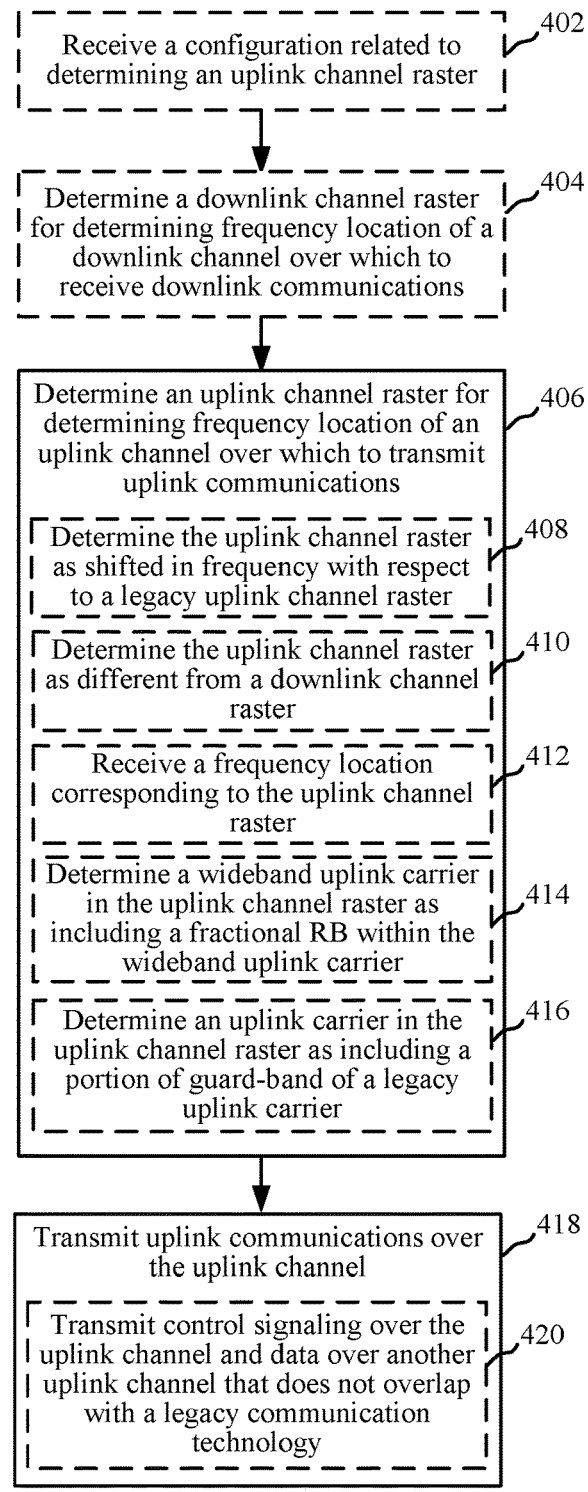
FIG. 4 is a flow chart illustrating an example of a method for determining an uplink channel raster, in accordance with various aspects of the present disclosure.
Figure 5:
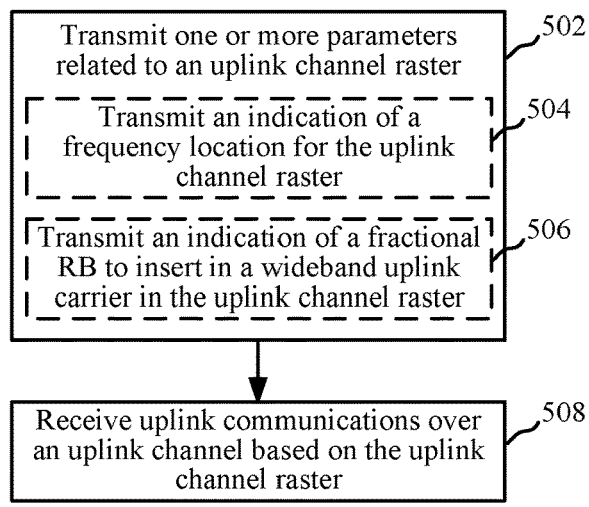
FIG. 5 is a flow chart illustrating an example of a method for transmitting one or more parameters regarding an uplink channel raster, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to determine a channel raster (e.g., an uplink and/or downlink channel raster) for communicating over an uplink and/or downlink channel with a base station 105. Moreover the base station 105 may be an example of the base stations described in the present disclosure (e.g., eNB, gNB, etc.) that are configured to receive uplink communications from the UE 115 over an uplink channel based on an uplink channel raster and/or transmit downlink communications to the UE 115 over a downlink channel based on a downlink channel raster.

In an aspect, the base station in FIG. 2 may include one or more processors 205 and/or memory 202 that may operate in combination with a configuring component 240 to perform the functions, methods (e.g., method 500 of FIG. 5), etc. presented in the present disclosure. In accordance with the present disclosure, the configuring component 240 may be configured to communicate one or more parameters regarding a configuration for an uplink and/or downlink channel raster to the UE 115. For example, the one or more parameters may correspond to a frequency location for the UL and/or DL channel raster, which may include a channel number (e.g., EARFCN) related to the UL and/or DL channel raster, a frequency location for inserting a fractional RB into a wideband on the UL channel raster (and/or a size of the fractional RB), etc. EARFCN stands for E-UTRA Absolute Radio Frequency Channel Number. In LTE, the carrier frequency in the uplink and downlink is designated by EARFCN, which ranges between 0-65535. EARFCN uniquely identifies the carrier frequency and LTE band.

The one or more processors 205 may include a modem 220 that uses one or more modem processors. The various functions related to the configuring component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the configuring component 240.

In some examples, the configuring component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the configuring component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can be communicatively coupled with transceiver 270. The transceiver 270 may be communicatively coupled with the one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or configuring component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining configuring component 240 and/or one or more of its sub-components. Additionally or alternatively, the base station 105 may include a bus 211 for communicatively coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 6. Similarly, the memory 202 may correspond to the memory described in connection with the base station in FIG. 6.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to determine a channel raster (e.g., an uplink channel raster and/or a downlink channel raster) for communicating over an uplink and/or downlink channel with a base station 105. Moreover the base station 105 may be an example of the base stations described in the present disclosure (e.g., eNB, gNB, etc.) that are configured to receive uplink communications from the UE 115 over an uplink channel based on an uplink channel raster and/or transmit downlink communications to the UE 115 over a downlink channel based on a downlink channel raster.

In an aspect, the UE 115 in FIG. 3 may include one or more processors 305 and/or memory 302 that may operate in combination with a communicating component 340 to perform the functions, methods (e.g., method 400 of FIG. 4), etc., presented in the present disclosure. In accordance with the present disclosure, the communicating component 340 may include a UL channel raster component 342 configured to determine an UL channel raster for transmitting UL communications to a base station 105 over an UL channel, an optional DL channel raster component 344 configured to determine a DL channel raster for receiving DL communications from the base station 105 over a DL channel, and/or an optional configuration receiving component 346 for receiving, from a base station 105, one or more parameter related to determining the UL channel raster.

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communicating component 340.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets as received by the communicating component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can be communicatively coupled with transceiver 370. The transceiver 370 may be communicatively coupled with one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the UE 115 may include a bus 311 for communicatively coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 6. Similarly, the memory 302 may correspond to the memory described in connection with the UE in FIG. 6.

FIG. 4 illustrates a flow chart of an example of a method 400 for determining (e.g., by a UE) an UL and/or DL channel raster for determining frequency location of an UL channel over which to transmit UL communications and/or a DL channel over which to receive DL communications.

Optionally, at Block 402, a configuration related to determining an uplink channel raster can be received. In an aspect, configuration receiving component 346, e.g., in conjunction with processor(s) 305, memory 302, communicating component 340, and/or transceiver 370, can receive the configuration related to determining the UL channel raster (e.g., from base station 105). For example, the configuration may include one or more parameters indicating a frequency location of the UL channel raster, which may include a channel number (e.g., EARFCN) based on which the UL channel raster can be determined, an indication of a fractional RB location or size for inserting into a wideband to align an UL channel over the UL channel raster with a legacy UL channel, etc., as described further herein. For example, configuration receiving component 346 may receive the configuration as part of an NR system information (SI) broadcast, such as one or more master information blocks (MIB), system information blocks (SIB), minimum SI, etc., which may additionally include a random access channel (RACH) configuration and/or the UL EARFCN. In another example, configuration receiving component 346 may receive the configuration in a RRC signaling, or other broadcast or dedicated signaling from the base station 105. Moreover, for example, configuration receiving component 346 may receive multiple configurations in different signaling (e.g., receiving the frequency location/channel number in broadcast signaling and/or a fractional RB in dedicated signaling, etc.). In another example, configuration receiving component 346 can receive the configuration as hardcoded or otherwise stored in memory 302 of the UE 115.

Optionally, at Block 404, a downlink channel raster for determining frequency location of a downlink channel over which the receive downlink communications can be determined. In an aspect, DL channel raster component 344, e.g., in conjunction with processor(s) 305, memory 302, communicating component 340, and/or transceiver 370, can determine the DL channel raster for determining frequency location of a DL channel over which to receive DL communications (e.g., from the base station 105). For example, DL channel raster component 344 may determine the DL channel raster to be different than an UL channel raster, as described further herein. In an example, DL channel raster component 344 may determine the DL channel raster based on a frequency location, such as a channel number (e.g., EARFCN) received in the configuration from the base station 105. For example, DL channel raster component 344 may determine the DL channel raster to be of a specific value (e.g., 120 kHz, 180 kHz, 300 kHz, etc.), and may use a formula to determine the DL channel raster based on the EARFCN channel number, $N_{DL}$, such as $F_{DL}=R_{DL}*N_{DL}$, where $N_{DL}$ can be the channel number (e.g., EARFCN) received for determining the DL channel raster, $F_{DL}$ can be the downlink frequency, $R_{DL}$ can be a raster value, which can be equal to 0.12 for 120 kHz, 0.18 for 180 kHz, 0.3 for 300 kHz, etc. That is, for a DL having a 120/180/300 kHz channel raster, with 0 kHz offset, the $F_{DL}=0.12/0.18/0.3*N_{DL}$ (MHz.) In any case, communicating component 340 can perform cell search based on the determined DL channel raster in an attempt to decode DL synchronization signals from one or more base stations 105 over the DL channel raster. Different raster offsets may depend on whether the channel raster is being determined for UL or DL channels. In this example, for the DL channel, an offset may not be used.

At Block 406, an uplink channel raster for determining frequency location of an uplink channel over which to transmit uplink communications can be determined. In an aspect, UL channel raster component 342, e.g., in conjunction with processor(s) 305, memory 302, communicating component 340, and/or transceiver 370, can determine the UL channel raster for determining the frequency location of a UL channel over which to transmit UL communications (e.g., to the base station 105). For example, UL channel raster component 342 can determine the UL channel raster for communicating using a low latency communication technology, such as 5G NR, where the UL channel raster can align in tone/RB to a legacy UL channel raster of a legacy communication technology, such as LTE, to facilitate coexistence of UL channels in the low latency communication technology with UL channels in the legacy communication technology. For example, aligning the UL channel rasters of the low latency communication technology and the legacy communication technology in this regard can allow for improved interference and/or resource utilization, as well as more flexible scheduling between the communication technologies (e.g., at base stations supporting co-located technologies), etc.

Figure 7:
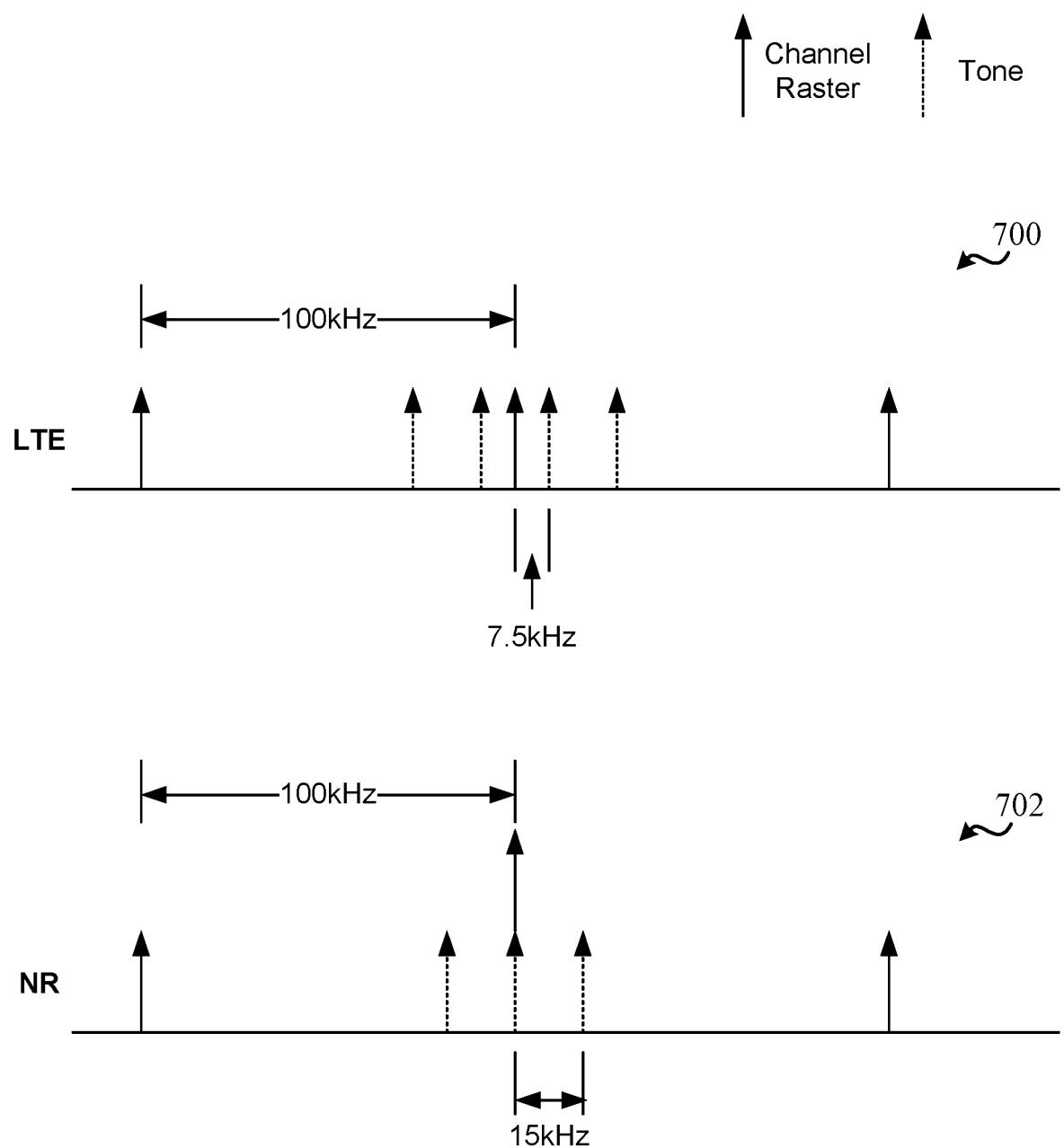
FIG. 7 is a schematic diagram illustrating examples of channel raster, in accordance with various aspects of the present disclosure.

For example, in determining the uplink channel raster at Block 406, optionally at Block 408, the uplink channel raster can be determined as shifted in frequency with respect to a legacy uplink channel raster. In an aspect, UL channel raster component 342, e.g., in conjunction with processor(s) 305, memory 302, communicating component 340, and/or transceiver 370, can determine the uplink channel raster as shifted in frequency with respect to a legacy uplink channel raster. For example, in the legacy communication technology, such as LTE, the UL channel raster may be shifted in frequency by a half of a tone (e.g., substantially 7.5 kHz, where a tone is 15 kHz in LTE) such to avoid transmitting over a DC tone. In the low latency communication technology, such as 5G NR, the avoidance of the DC tone may not be a consideration or requirement of the technology, and thus the UL channel raster component 342 may determine the UL channel raster based on a similar shift as in the legacy communication technology to facilitate aligning the UL channel raster with the legacy UL channel raster (considering the tone shift of the legacy communication technology). In an example, UL channel raster component 342 can determine the UL channel raster based on a shift in the range of a half tone of the legacy communication technology, which may be 7-8 kHz, or substantially 7.5 kHz. Thus, in one example, UL channel raster component 342 may determine the UL channel raster by applying an offset to a frequency to effectuate the shift. For example, UL channel raster component 342 may determine the UL channel raster based on a channel number, $N_{UL}$, such as $F_{UL}=O+R_{UL}*N_{UL}$, where $N_{UL}$ can be the channel number (e.g., EARFCN) received for determining the UL channel raster, $F_{UL}$ is the uplink frequency, $R_{UL}$ can be a raster value, which can be equal to 0.1 for 100 kHz, O can be the offset to effectuate the frequency shift, which may be 0.0075 for 7.5 kHz, etc. For example, assuming the EARFCN definition starts from a fixed absolute frequency value, the UL can have a 100 kHz channel raster, with a 7.5 kHz offset to align with the LTE UL half tone (7.5 kHz) shift. The $F_{UL}=0.0075+0.1*N_{UL}$ (MHz), where N is the EARFCN channel number and $F_{UL}$ is the uplink frequency. Unlike the DL, in some examples, here there is a raster offset. An example of UL channel raster is shown in FIG. 7, which illustrates an example UL channel raster 700 for LTE, and an example UL channel raster 702 for 5G NR. As shown, for example, the UL channel raster 702 for 5G NR can be offset (e.g., by 7.5 kHz) to align tones with UL channel raster 700 for LTE.

In another example, in determining the uplink channel raster at Block 406, optionally at Block 410, the uplink channel raster can be determined as different from a downlink channel raster. In an aspect, UL channel raster component 342, e.g., in conjunction with processor(s) 305, memory 302, communicating component 340, and/or transceiver 370, can determine the UL channel raster as different from the DL channel raster. For example, in the low latency communication technology, such as 5G NR, the UL channel raster and DL channel raster can have different values. For example, the UL channel raster component 342 may determine the UL channel raster to be 100 kHz, which can be the same as the legacy UL channel raster (e.g., LTE) to achieve coexistence, as described, while the DL channel raster component 344 may determine the DL channel raster to be of a different value, such as 120 kHz, 180 kHz, 300 kHz, etc., to achieve tone alignment between NR data/control and a synchronization signal. In addition, in an example, a relationship between the DL channel raster and the UL channel raster may be different for different system bandwidths (e.g., sub-6 GHz (or sub 3.5 GHz) can have different DL and UL channel rasters, while above 6 GHz (or above 3.5 GHz) can have the same DL and UL channel raster).

In another example, in determining the uplink channel raster at Block 406, optionally at Block 412, a frequency location corresponding to the uplink channel raster can be received. In an aspect, configuration receiving component 346, e.g., in conjunction with processor(s) 305, memory 302, communicating component 340, and/or transceiver 370, can receive the frequency location (e.g., channel number) corresponding to the UL channel raster. For example, configuration receiving component 346 may receive the channel number as a different channel number from a DL channel number for determining the DL channel raster. In one example, the channel number can correspond to an EARFCN. In one example, configuration receiving component 346 can receive the frequency location based on a capability of the UE 115 to communicate using only NR or NR and LTE. Once the UE acquires the DL, the base station 105 can indicate to the UE 115 what frequency is used for the UL. Where the UE 115 communicates only using NR (that is NR standalone (SA) deployment), for example, configuration receiving component 346 can receive the frequency location from a NR SI broadcast (e.g., via MIB, SIB, etc.) from a base station 105, which may also include a RACH configuration for performing random access with the base station 105 and the UL EARFCH. Where the UE 115 communicates using LTE and NR (that is NR non-standalone (NSA) deployment), for example, the UE 115 can acquire an LTE cell with the base station 105, and configuration receiving component 346 can receive the frequency location or other configuration parameters (e.g., RACH configuration) for NR from the LTE cell, which may be by way of RRC signaling or other dedicated signaling from the LTE cell. In any case, after the NR UE acquires LTE cell, the base station 105 can configure the NR UE from LTE cell about the NR UL configuration, including UL EARFCH, as well UL RACH configuration (in addition to the DL EARFCH, synchronization signal configuration, etc.).

In another example, in determining the uplink channel raster at Block 406, optionally at Block 414, a wideband uplink carrier in the uplink channel raster can be determined as including a fractional RB within the wideband uplink carrier. In an aspect, communicating component 340, e.g., in conjunction with processor(s) 305, memory 302, and/or transceiver 370, can determine the wideband UL carrier in the UL channel raster as including the fractional RB within the wideband UL carrier. For example, communicating component 340 may insert the fractional RB within the wideband UL carrier to align with the legacy communication technology. The fractional RB is inserted into the NR RB to allow the NR and LTE RB alignment.

For example, where the wideband UL carrier spans multiple legacy UL carriers in the legacy communication technology, there may typically be a guard-band between the multiple legacy UL carriers. Accordingly, communicating component 340 can configure a size of the wideband UL carrier to include the guard-band as well as the multiple legacy UL carriers. In a specific example, in LTE, each UL carrier may be 20 megahertz (MHz). For LTE contiguous CA, fractional RB may be needed between two CC (e.g. 20 MHz). For a NR wideband UE (e.g. across two LTE CC), to account for fractional RB between two LTE CC, NR can introduce corresponding fractional RB to achieve RB alignment with LTE. Thus, for a wideband UL carrier of 40 MHz in 5G NR, communicating component 340 can configure the wideband UL carrier to span two contiguous LTE UL carriers along with the fractional RB corresponding to the guard-band between the contiguous 20 MHz carriers, as specified in LTE, to facilitate alignment of the tones/RBs between 5G NR and LTE over the UL carriers. In one example, as described, configuration receiving component 346 may receive an indication of the fractional RB size or location within the wideband UL carrier, which may be cell-specific (and/or specific to a group of UEs), from the base station 105, and communicating component 340 can accordingly configure the wideband UL carrier to include the fractional RB in the configured location and/or to be of the configured size. In an example, communicating component 340 may use the fractional RB to perform interference management (e.g., to determine one or more interfering signals transmitted or received over the UL carrier based on interference measured at the fractional RB).

In another example, in determining the uplink channel raster at Block 406, optionally at Block 416, an uplink carrier in the uplink channel raster can be determined as including a portion of the guard-band of a legacy uplink carrier. In an aspect, communicating component 340, e.g., in conjunction with processor(s) 305, memory 302, and/or transceiver 370, can determine the uplink carrier in the uplink channel raster as including the portion of guard-band of the legacy uplink carrier. For example, the legacy UL carrier may use more guard-band than that defined for the low latency communication technology. Accordingly, communicating component 340 can utilize at least a portion of the guard-band for the uplink carrier in the low latency communication technology. In a specific example, LTE can use a 10% guard-band, 5% at each end, of a UL carrier (e.g., 1 MHz at each end of a 20 MHz carrier). 5G NR may use a smaller guard-band, such as 2-3%, which in one example equates to 200-300 kHz. Accordingly, communicating component 340, in configuring a UL carrier in 5G NR, can use additional RBs typically reserved for guard-band in LTE, such as around 3-4RB at each end of the LTE UL carrier to which the 5G NR UL carrier is aligned.

At Block 418, the UE can transmit uplink communications over the uplink channel. In an aspect, communicating component 340, e.g., in conjunction with processor(s) 305, memory 302, and/or transceiver 370, can transmit uplink communications (e.g., to base station 105) over the uplink channel. For example, communicating component 340 can transmit the uplink communications over the uplink channel as determined based on the uplink channel raster (e.g., which may include a wideband UL carrier, a UL carrier that uses at least a portion of legacy guard-band, etc.).

In an example, in transmitting the uplink communications at Block 418, optionally at Block 420, control signaling can be transmitted over the uplink channel and data can be transmitted over another uplink channel that does not overlap with a legacy communication technology. In an aspect, communicating component 340, e.g., in conjunction with processor(s) 305, memory 302, and/or transceiver 370, can transmit control signaling over the uplink channel and data over another uplink channel that does not overlap with the legacy communication technology. For example, the UL channel can be over the UL carrier that coexists with the legacy communication technology, e.g., LTE, and may thus have more efficient resource utilization and link budget. Accordingly, this UL channel can carry more critical information, such as layer 1 control, layer 2 control (e.g., RLC status PDU), layer 3 control (e.g., RRC signaling), etc. The other uplink channel can be over an UL carrier that does not coexist with the legacy communication technology, and may be used to transmit less critical information, such as data (e.g., sounding reference signal (SRS) data for TDD channel reciprocity based deployments).

FIG. 5 illustrates a flow chart of an example of a method 500 for transmitting (e.g., by a base station) configuration parameters for determining an UL and/or DL channel raster.

In method 500, at Block 502, one or more parameters related to an uplink channel raster can be transmitted. In an aspect, configuring component 240, e.g., in conjunction with processor(s) 205, memory 202, and/or transceiver 270, can transmit (e.g., to a UE 115) the one or more parameters related to the uplink channel raster. For example, the one or more parameters may be transmitted using broadcast signaling (e.g., SI broadcast), dedicated signaling (e.g., RRC signaling), and/or the like.

In an example, in transmitting the one or more parameters at Block 502, optionally at Block 504, an indication of a frequency location for the uplink channel raster can be transmitted. In an aspect, configuring component 240, e.g., in conjunction with processor(s) 205, memory 202, and/or transceiver 270, can transmit the indication of the frequency location (e.g., channel number) for the uplink channel raster. As described, in one example, the channel number can be different than a channel number indicated for the DL channel raster. Moreover, for example, configuring component 240 can utilize different mechanisms for transmitting the frequency location based on whether the UE 115 is configured for communicating using only the low latency communication technology, or the low latency communication technology and the legacy communication technology, as described above.

In an example, in transmitting the one or more parameters at Block 502, optionally at Block 506, an indication of a fractional RB to insert into a wideband uplink carrier in the uplink channel raster can be transmitted. In an aspect, configuring component 240, e.g., in conjunction with processor(s) 205, memory 202, and/or transceiver 270, can transmit (e.g., to the UE 115) the indication of the fractional RB to insert in the wideband uplink carrier in the uplink channel raster. For example, the indication may correspond to a location within frequency and/or a size of the fractional RB. As described, for example, the UE 115 can insert the fractional RB based on the configuration in configuring a UL carrier. In an example, base station 105 may use the fractional RB to perform interference management (e.g., to determine one or more interfering signals received over the UL carrier based on interference measured at the fractional RB).

In method 500, at Block 508, uplink communications can be received over an uplink channel based on the uplink channel raster. In an aspect, transceiver 270, e.g., in conjunction with processor(s) 205 and/or memory 202, can receive the uplink communications (e.g., from the UE 115) over the UL channel based on the UL channel raster. In an example, transceiver 270 can determine the UL channel based on the UL channel raster by detecting a frequency location along the UL channel raster over which signals are received from the UE 115.

Figure 6:
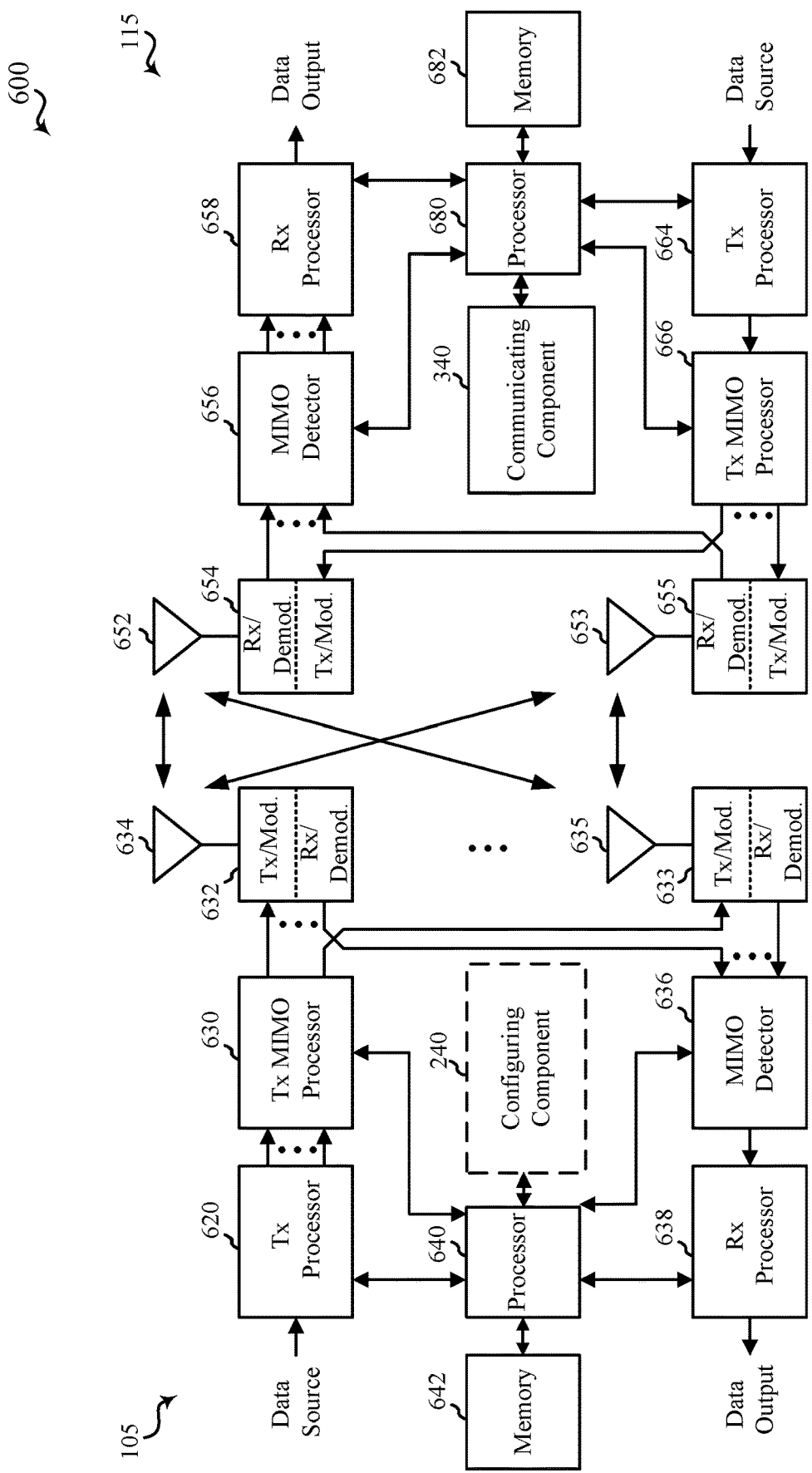
FIG. 6 is a block diagram illustrating an example of a MIMO communication system including a base station and a UE, in accordance with various aspects of the present disclosure.

FIG. 6 is a block diagram of a MIMO communication system 600 including a base station 105 and a UE 115. The MIMO communication system 600 may illustrate aspects of the wireless communication system 100 described with reference to FIG. 1. The base station 105 may be an example of aspects of the base station 105 described with reference to FIGS. 1, 2, and 3. The base station 105 may be equipped with antennas 634 and 635, and the UE 115 may be equipped with antennas 652 and 653. In the MIMO communication system 600, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 115 may be an example of aspects of the UEs 115 described with reference to FIGS. 1, 2, and 3. At the UE 115, the UE antennas 652 and 653 may receive the DL signals from the base station 105 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 115 to a data output, and provide decoded control information to a processor 680, or memory 682.

The processor 680 may in some cases execute stored instructions to instantiate a communicating component 340 (see e.g., FIGS. 1 and 3).

On the uplink (UL), at the UE 115, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 105 in accordance with the communication parameters received from the base station 105. At the base station 105, the UL signals from the UE 115 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a configuring component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications by a user equipment (UE), comprising:
   determining an uplink channel raster for an uplink channel of a first system;
   determining to shift, with respect to the uplink channel raster, an uplink transmission over the uplink channel by an offset in frequency, wherein the shift of the uplink transmission is based at least in part on tones of uplink carriers of the first system not being aligned with tones of uplink carriers of a second system; and
   transmitting the shifted uplink transmission, wherein the shifted uplink transmission aligns in frequency with a second uplink channel of the second system.

2. The method of claim 1, wherein the offset in frequency is 7.5 kilohertz.

3. The method of claim 1, wherein the first system is new radio (NR) and the second system is long term evolution (LTE).

4. The method of claim 1, further comprising:
   receiving, from a base station, a parameter indicating to shift the uplink transmission by the offset in frequency, wherein the shift of the uplink transmission is based at least in part on receiving the parameter.

5. The method of claim 4, wherein receiving the parameter includes receiving, from the base station, the parameter in radio resource control (RRC) signaling.

6. The method of claim 5, wherein receiving the parameter is based on indicating a capability to communicate using at least the first system.

7. The method of claim 1, wherein the offset in frequency is in a range of 7 to 8 kilohertz.

8. The method of claim 1, further comprising:
   identifying a downlink channel raster for a downlink channel over which to receive downlink communications from a base station,
   wherein the uplink channel raster is of a different value than the downlink channel raster.

9. The method of claim 1, further comprising:
   determining an uplink frequency for the uplink channel based on one or more of the offset, the uplink channel raster, and an uplink channel number, and
   wherein transmitting the shifted uplink transmission includes transmitting the shifted uplink transmission over the uplink frequency.

10. The method of claim 9, further comprising:
    receiving, from a base station and in broadcasted system information, along with a random access channel configuration, or in radio resource control (RRC) signaling, the uplink channel number.

11. The method of claim 1, wherein transmitting the shifted uplink transmission includes:
    transmitting uplink control signaling over the uplink channel, and
    transmitting uplink data over a third uplink channel of the first system.

12. The method of claim 11, wherein the first uplink channel overlaps in frequency with the second system, and wherein the third uplink channel does not overlap in frequency with the second system.

13. A method for wireless communications by a user equipment (UE), comprising:
    determining an uplink channel raster for an uplink channel of a first system;
    determining to shift, with respect to the uplink channel raster, an uplink transmission over the uplink channel by an offset in frequency, wherein the offset in frequency is less than a subcarrier spacing associated with a second system; and
    transmitting the shifted uplink transmission, wherein the shifted uplink transmission aligns in frequency with a second uplink channel of the second system.

14. The method of claim 13, wherein the offset in frequency is 7.5 kilohertz.

15. The method of claim 13, wherein the first system is new radio (NR) and the second system is long term evolution (LTE).

16. The method of claim 13, further comprising receiving, from a base station, a parameter indicating to shift the uplink transmission by the offset in frequency, wherein the shift of the uplink transmission is based at least in part on receiving the parameter.

17. The method of claim 16, wherein receiving the parameter includes receiving, from the base station, the parameter in radio resource control (RRC) signaling.

18. An apparatus for wireless communication, comprising:
a transceiver;
a memory configured to store instructions; and
one or more processors communicatively coupled with the transceiver and the memory, wherein the one or more processors are configured to cause the apparatus to:
determine an uplink channel raster for an uplink channel of a first system;
determine to shift, with respect to the uplink channel raster, an uplink transmission over the uplink channel by an offset in frequency, wherein the shift of the uplink transmission is based at least in part on tones of uplink carriers of the first system not being aligned with tones of uplink carriers of a second system; and
transmit the shifted uplink transmission, wherein the shifted uplink transmission aligns in frequency with a second uplink channel of the second system.

19. The apparatus of claim 18, wherein the offset in frequency is 7.5 kilohertz.

20. The apparatus of claim 18, wherein the first system is new radio (NR) and the second system is long term evolution (LTE).

21. The apparatus of claim 18, wherein the one or more processors are further configured to cause the apparatus to receive, from a base station, a parameter indicating to shift the uplink transmission by the offset in frequency, wherein the one or more processors are configured to cause the apparatus to shift the uplink transmission based at least in part on receiving the parameter.

22. The apparatus of claim 21, wherein the one or more processors are configured to cause the apparatus to receive the parameter in radio resource control (RRC) signaling from the base station.

23. The apparatus of claim 21, wherein the one or more processors are configured to cause the apparatus to receive the parameter based on indicating a capability to communicate using at least the first system.

24. The apparatus of claim 18, wherein the offset in frequency in a range of 7 to 8 kilohertz.

25. The apparatus of claim 18, wherein the one or more processors are further configured to cause the apparatus to:
determine an uplink frequency for the uplink channel based on one or more of the offset, the uplink channel raster, and an uplink channel number, and
wherein the one or more processors are configured to cause the apparatus to transmit the shifted uplink transmission over the uplink frequency.

26. The apparatus of claim 25, wherein the one or more processors are further configured to cause the apparatus to:
receive, from a base station and in broadcasted system information, along with a random access channel configuration, or in radio resource control (RRC) signaling, the uplink channel number.

27. The apparatus of claim 18, wherein the one or more processors are configured to cause the apparatus to transmit the shifted uplink transmission as uplink control signaling over the uplink channel, and transmit uplink data over a third uplink channel of the first system.

28. The apparatus of claim 27, wherein the first uplink channel overlaps in frequency with the second system, and wherein the third uplink channel does not overlap in frequency with the second system.

29. An apparatus for wireless communication, comprising:
a transceiver;
a memory configured to store instructions; and
one or more processors communicatively coupled with the transceiver and the memory, wherein the one or more processors are configured to cause the apparatus to:
determine an uplink channel raster for an uplink channel of a first system;
determine to shift, with respect to the uplink channel raster, an uplink transmission over the uplink channel by an offset in frequency, wherein the offset in frequency is less than a subcarrier spacing associated with a second system; and
transmit the shifted uplink transmission, wherein the shifted uplink transmission aligns in frequency with a second uplink channel of the second system.

30. The apparatus of claim 29, wherein the offset in frequency is 7.5 kilohertz.

* * * * *